United States Patent [19]

Kase

[11] Patent Number: 5,132,895
[45] Date of Patent: Jul. 21, 1992

[54] VARIABLE CHARGE PUMPING DC-TO-DC CONVERTER

[75] Inventor: Kiyoshi Kase, Chiba, Japan

[73] Assignee: Motorola, Inc., Schaumburg, Ill.

[21] Appl. No.: 625,519

[22] Filed: Dec. 11, 1990

[51] Int. Cl.⁵ .................................................. H02M 3/07
[52] U.S. Cl. ..................................... 363/60; 307/110; 363/59
[58] Field of Search ................... 363/59, 60; 307/110; 315/241 P

[56] References Cited

U.S. PATENT DOCUMENTS

| | | | |
|---|---|---|---|
| 3,340,426 | 9/1967 | Elliot | 315/241 P |
| 3,749,921 | 7/1973 | Vital et al. | 315/241 P |
| 4,050,004 | 9/1977 | Greatbatch | 363/59 |
| 4,134,057 | 1/1979 | Portmann | 363/21 |
| 4,291,369 | 9/1981 | Hochstrate | 363/60 |
| 4,404,624 | 9/1983 | Yamazaki | 363/59 |
| 4,689,734 | 8/1987 | Lang | 363/59 |
| 4,769,753 | 9/1988 | Knudson et al. | 363/60 |
| 4,888,673 | 12/1989 | Droege | 363/21 |
| 4,982,315 | 1/1991 | Hoffman | 363/60 |

Primary Examiner—Steven L. Stephan
Assistant Examiner—Ben Davidson
Attorney, Agent, or Firm—Charles R. Lewis; Eugene A. Parsons

[57] ABSTRACT

Two storage capacitors connected in parallel with a constant current source in a charging mode and connected in series in a second mode to increase output voltage. A comparator senses the amplitude of the output voltage and controls the current supplied to the capacitors in the charging mode to increase or decrease the output voltage to coincide with a predetermined amplitude.

7 Claims, 2 Drawing Sheets

VARIABLE CHARGE PUMPING DC-TO-DC CONVERTER

The present invention pertains to charge pumping DC-to-DC converters and more specifically to variable charge pumping DC-to-DC converters in which the output can be varied to compensate for variations in the input.

BACKGROUND OF THE INVENTION

Charge pumping DC-to-DC converters are used in power supplies in conjunction with many integrated circuits, and especially with batteries and the like. In such circuits it is not uncommon for the source of power (e.g. the battery) to vary by as much as 50%. For example, a 6 volt battery might normally not be changed until it drops as low as 3 volts.

Charge pumping DC-to-DC converters generally operate with at least two capacitors which are first connected in parallel with the power source until they are charged and are then connected in series with the power source to provide a much higher potential at an output. In this example using two capacitors, if a six volt battery is connected to the input a maximum output voltage of 18 volts is achieved. However, if the battery voltage drops to only 3 volts the maximum output drops to 9 volts.

Prior art devices compensated for such variations by converting the output to a value which would operate attached electronic circuits with the lowest acceptable potential, in the above example 9 volts. The problem with this solution is that the highest maximum output, 18 volts in the above example, is much too high. Thus, it is necessary for prior art circuits to include some voltage clamping device, such as a Zener diode, to reduce the output voltage to an acceptable level. The clamping device sinks current during the period of excess voltage to drop the voltage to the required level. Also, series pass devices, such as resistors, are used in the output of prior art converters to aid in filtering the output voltage. Because voltage is dropped across these series pass devices, it is necessary to raise the maximum voltage in the converter even higher to provide the required output voltage.

In most cases the switching of the capacitors, connections to the output terminal, etc. are accomplished by switching transistors. The extremely high voltages from the capacitors has a tendency to cause breakdowns in the switching transistors and produce latch-up and/or reliability problems. This is especially true since the geometry in semiconductor wafer processing is getting smaller and, consequently, the breakdown voltages of transistors is getting lower. As an additional problem it should also be noted that the prior art circuits waste power by sinking current to reduce the output voltage to some substantially lower value and by requiring series pass components in the output circuit.

SUMMARY OF THE INVENTION

It is an object of the present invention to provide a new and improved variable charge pumping DC-to-DC converter.

It is a further object of the present invention to provide a new and improved variable charge pumping DC-to-DC converter in which the output can be varied to compensate for variations in the input voltage.

It is a further object of the present invention to provide a new and improved variable charge pumping DC-to-DC converter in which the output can be controlled to prevent overloading and consequent breakdown of components therein.

It is a further object of the present invention to provide a new and improved variable charge pumping DC-to-DC converter that is more economical than prior art converters because current sinking and series pass components are not required in the output.

These and other objects are realized in a variable charge pumping DC-to-DC converter including a plurality of capacitances, a controllable current source having an output terminal and a reference terminal, switching apparatus connecting each of the plurality of capacitances in parallel between the output terminal and the reference terminal of said controllable current source in a first mode and connecting all of the plurality of capacitances in series in a second mode of operation, and means for varying the controllable current source to control the value to which the plurality of capacitances charge when the switching apparatus is in the first mode.

BRIEF DESCRIPTION OF THE DRAWINGS

Referring to the drawings.

DESCRIPTION OF THE PREFERRED EMBODIMENT

Figure 1:
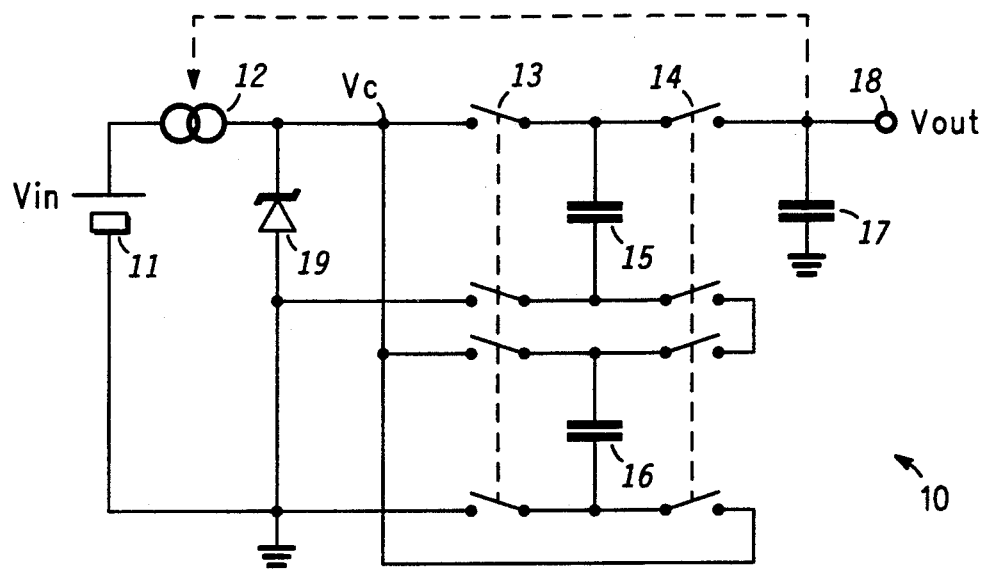
FIG. 1 is a simplified schematic diagram of a variable charge pumping DC-to-DC converter embodying the present invention.

Referring specifically to FIG. 1, a simplified schematic diagram of a variable charge pumping DC-to-DC converter 10 embodying the present invention is illustrated. Converter 10 is connected to a power supply 11, which in this embodiment is a source of voltage Vin. The negative terminal of power supply 11 is connected to ground and the positive terminal is connected to a current source 12, which may be any device (such as a transistor or other devices well known to those skilled in the art) that converts power supply 11 to a current source. Converter 10 includes, besides current source 12, a first four pole switch 13, a second four pole switch 14, first and second storage capacitors 15 and 16 and a filter capacitor 17.

First switch 13 is utilized to connect each storage capacitor 15 and 16 in parallel with power supply 11 and current source 12 in a first or charging mode of operation. In this charging mode of operation, filter capacitor 17 and an output terminal 18 connected thereto are disconnected from the circuit and storage capacitors 15 and 16 are allowed to charge to some value determined by the amount of current supplied by current source 12 and the length of time that storage capacitors 15 and 16 are connected to receive current from current source 12. After a predetermined length of time, first switch 13 is opened and, with a slight delay to prevent the simultaneous closure of both switches, second switch 14 is closed. Second switch 14 connects power supply 11, current source 12, storage capacitor 15 and storage capacitor 16 in series between ground and output terminal 18. At this time, the maximum output voltage can be as high as three times the value of the voltage Vin.

In many instances power source 11 will be a battery or the like with relatively wide variations in the amount of voltage supplied to converter 10. As an example, Vin may be reduced by as much as 50% and converter 10 will still be expected to supply sufficient power to circuitry (not shown) attached to output terminal 18. Further, converter 10 must be able to perform this function without supplying large over-voltages to components and wasting large amounts of power during the time that Vin is maximum. To overcome this problem, converter 10 must be designed to supply a required amount of power at output terminal 18 and to all components whenever power supply 11 is within certain predetermined limits. To this end, converter 10 further includes a feedback connection from output terminal 18 to current source 12 for the purpose of controlling the amount of current supplied by current source 12 in accordance with the amplitude of the output voltage.

The amplitude of the output voltage at terminal 18 is dependent upon the size of storage capacitors 15 and 16 and the amount of charge stored in storage capacitors 15 and 16 during the charging mode of operation. In all cases, the amount of charge stored in storage capacitors 15 and 16 depends upon the amount of current supplied thereto and the length of time which the current is supplied. The amount of charge stored can be controlled in a variety of ways. For example, the length of time that current source 12 is connected to storage capacitors 15 and 16, which length of time is increased when the output voltage is low and decreased when the output voltage is high. Such timing can be accomplished in current source 12 or by controlling first switch 13. The current can be controlled directly by various forms of modulation which will vary the amount of current supplied by current source 12 in a predetermined length of time.

Figure 2A:
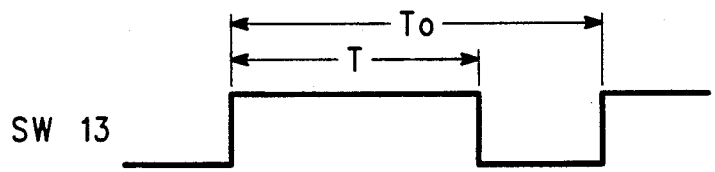
FIG. 2A, FIG. 2B, and FIG. 2C illustrate some typical waveforms available at three different points in the schematic of FIG. 1.
Figure 2B:
Figure 2C:
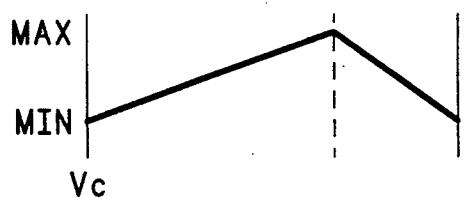

Referring to FIG. 2, three waveforms are illustrated which help to explain the operation of the circuit illustrated in FIG. 1. Waveforms A and B illustrate the timing of switches 13 and 14, respectively. Waveform C illustrates the charging of storage capacitors 15 and 16 during the portion T of the period $T_O$ and the discharge during the remaining portion of the period $T_O$. From waveform C it can be seen that variations in the length of time T will vary the maximum of voltage Vc, i.e. as T increases the maximum value of Vc increases and as T decreases the maximum value of Vc decreases. While FIG. 2 deals with the time current supplied from current source 12 to charging capacitors 15 and 16, it should be understood that similar control over the output voltage can be attained by controlling (e.g. modulating) the amount of current supplied by current source 12.

A clamping diode 19 is optionally placed in converter 10 in parallel with capacitors 15 and 16 during the charging mode. Diode 19 will prevent capacitors 15 and 16 from charging to excessively high potentials during quick rises in the input voltage or quick changes in load currents, which are not controlled by the feedback loop. If the time constant of the load connected to output terminal 18 is slow, compared to the feedback loop time constant, clamping diode 19 may be removed without voltage spikes appearing at output terminal 18. It should be noted that clamping diode 19 is in the charge circuit and not the output circuit as in prior art devices. Thus, clamping diode 19 only effects sudden peaks in the power supply and does not sink current during normal operation.

Figure 3:
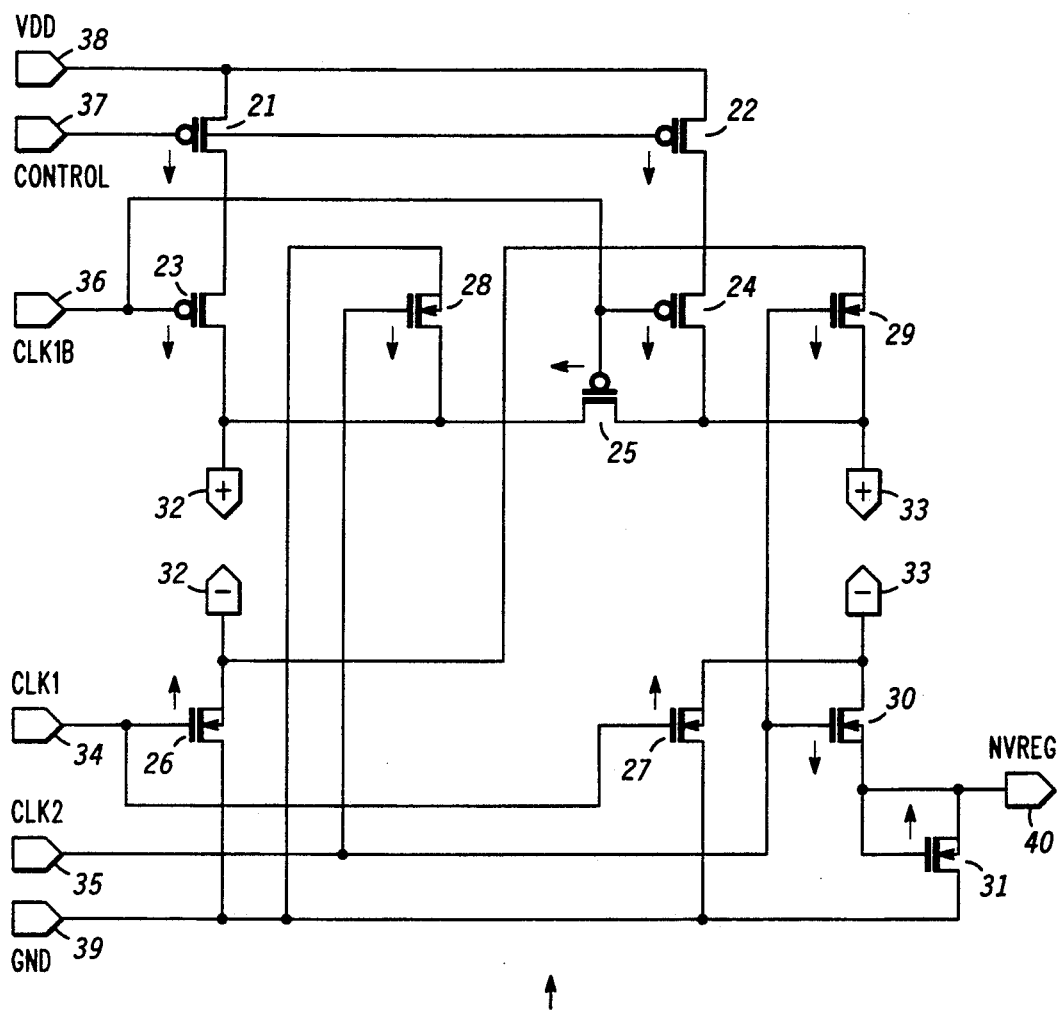
FIG. 3 is a schematic diagram of another embodiment of a variable charge pumping DC-to-DC converter embodying the present invention.

Referring to FIG. 3, another and more specific circuit of a variable charge pumping DC-to-DC converter 20 embodying the present invention is illustrated schematically. Converter 20 includes two field effect transistors (FET) 21 and 22, which operate as a current source, FETs 23 through 27, which operate as a first switch, FETs 28 through 30, which operate as a second switch and FET 31 connected in a capacitive diode mode, which operates as a filter capacitor. Since converter 20 is designed to be included in an integrated circuit, pairs of external connecting pads 32 and 33 are provided for the connection of external capacitors (not shown) therebetween to operate as the storage capacitors. Three different timing signals are supplied to input terminals 34, 35 and 36, respectively, and a control signal is supplied to input terminal 37. An input terminal 38 is adapted to be connected to a source of power, $V_{DD}$, and an input terminal 39 is adapted to be connected to a reference potential, in this embodiment, ground. An output terminal 40 is adapted to supply a negative regulated voltage to external circuitry (not shown).

A first timing signal is supplied on terminal 34 to alternately connect and disconnect the negative pad of pairs of connecting pads 32 and 33 through the current carrying electrodes of FETs 26 and 27 to the ground potential at terminal 39. A second, slightly delayed timing signal is supplied on terminal 36 to alternately connect and disconnect the positive pad of pairs of connecting pads 32 and 33 in series with current source FETs 21 and 22. A third timing signal, approximately out of phase with the first timing signal, is supplied on terminal 35 to alternately disconnect and connect ground terminal 39 to the positive pad of pairs of pads 32 through FET 28, the negative pad of pairs of pads 32 to the positive pad of pairs of pads 33 through FET 29, and the negative pad of pairs of pads 33 to the output terminal 40 through FET 30. As in the previous description, the first and second timing signals cooperate to connect the storage capacitors to the current source, FETs 21 and 22, in parallel and in a charging mode. The second timing signal is slightly delayed from the first timing signal to ensure that current can not accidently be supplied from the current source directly to ground through some combination of FETs. The third timing signal connects the storage capacitors in series between ground terminal 39 and output terminal 40. In this particular embodiment, the current source is not connected in series with the capacitors in the output mode because the power supplied by converter 20 is negative and to illustrate the versatility of the present invention.

Figure 4:
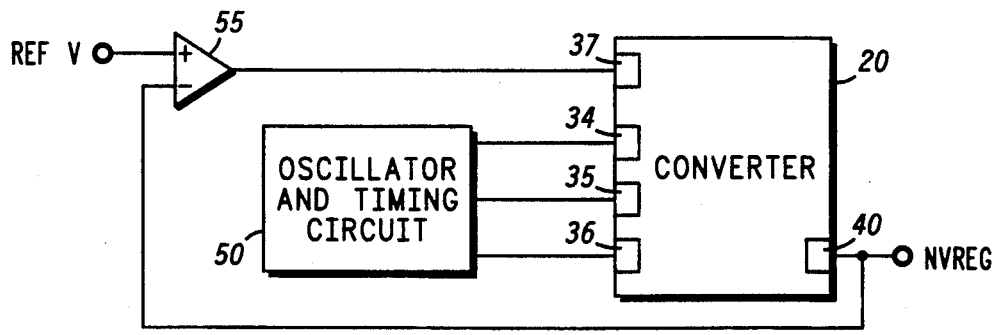
FIG. 4 is a schematic diagram of a negative power supply including the converter of FIG. 3.

The operation of converter 20 is best described in conjunction with the additional circuitry illustrated in FIG. 4. Input terminals 34, 35 and 36 are connected to receive timing output signals from an oscillator/timing circuit 50. Output terminal 40 of converter 20 is connected to a negative input of a comparator 55 (which may be for example an opamp), the positive input of which has a reference potential applied thereto. The output terminal of comparator 55 is connected to the input terminal 37 of converter 20. For this specific connection of converter 20, the first second and third timing signals simply alternate and are not variable in duration. Comparator 55 compares the negative output voltage on terminal 40 of converter 20 to a predetermined reference potential and supplies control signals to input terminal 37 of converter 20. A control signal is supplied on terminal 37 to cause FETs 21 and 22 to conduct a constant current whenever comparator 55 senses that the output potential of converter 20 is at or below the predetermined potential. When comparator 55 senses that the output potential of converter 20 has exceeded the predetermined potential, a signal turning off FETs 21 and 22 is supplied to converter 20. Thus, even though timing signals continue to be sent to input terminals 34, 35 and 36, no current is supplied to charge the storage capacitors and the output potential will be reduced to approximately the predetermined potential. In this embodiment, oscillator/timing circuit 50 operates at, for example, a frequency of 20 KHz. Therefore the current control described is actually a very fine adjustment of the output voltage.

Thus, a new and improved variable charge pumping DC-to-DC converter has been disclosed which is controlled to supply a required output voltage as long as the input power supply remains within predetermined boundaries. The converter is controlled to reduce the maximum voltage across components of the converter and in the output without reducing the range of input voltages that are acceptable and, in fact, the range may actually be increased. Thus, failures (breakdowns) in the converter and connected circuitry are drastically reduced because of the reduction in over-voltage. It should also be noted that no series pass filter circuit is required in the output, which reduces the maximum operating voltage of the output circuit components. In addition, the feedback loop, or additional feedback loops if desired, operate to regulate output voltage and/or output current. Also, the converter reduces the amount of power utilized, since high voltages applied to the input are not reduced in amplitude by means of clamping diodes in the output circuit. That is, low power consumption is achieved because sink current into an output clamping diode is not required.

While I have shown and described specific embodiments of the present invention, further modifications and improvements will occur to those skilled in the art. I desire it to be understood, therefore, that this invention is not limited to the particular forms shown and I intend in the append claims to cover all modifications that do not depart from the spirit and scope of this invention.

What is claimed is:

1. In conjunction with a charge pumping DC-to-DC converter including a plurality of capacitances, a power source having an output terminal and a reference terminal, and switches connecting each of the plurality of capacitances in parallel between the output terminal and the reference terminal of said power source in a first mode and coupling all of the plurality of capacitances in series to supply output power therefrom in a second mode of operation, a method of varying the output power comprising the steps of:
   maintaining the length of time of operation in the first and second modes substantially constant;
   sensing the value of the output power; and
   controlling the amount of current applied to the plurality of capacitances in the first mode in accordance with the value of the output power sensed.

2. A method of varying the output power as claimed in claim 1 wherein the step of sensing the output power includes comparing the amplitude of the output voltage to a predetermined reference voltage.

3. A method of varying the output power as claimed in claim 2 wherein the step of controlling the amount of current includes providing a current source from the power source.

4. A method of varying the output power as claimed in claim 3 wherein the step of controlling the amount of current further includes disconnecting the current source from the switches when the output voltage exceeds the predetermined reference voltage and reconnecting the current source to the switches when the output voltage is below the predetermined amount.

5. A method of varying the output power as claimed in claim 3 wherein the step of controlling the amount of current includes switching the power source off when the sensed value of the output power is above a predetermined value and switching the power source on when the sensed value of the output power is at and below the predetermined value.

6. In conjunction with a charge pumping DC-to-DC converter including a plurality of capacitances, a power source having an output terminal and a reference terminal, and switches connecting each of the plurality of capacitances in parallel between the output terminal and the reference terminal of said power source in a first mode and coupling all of the plurality of capacitances in series to supply output power therefrom in a second mode of operation, a method of varying the output power comprising the steps of:
   maintaining the length of time of operation in the first and second modes substantially constant;
   sensing the value of the output power; and
   disconnecting and connecting the power source to the switches to control the amount of current applied to the plurality of capacitances in the first mode in accordance with the value of the output power sensed.

7. A method of varying the output power as claimed in claim 6 wherein the step of disconnecting and connecting the power source to the switches and the switches connecting each of the plurality of capacitances are performed at different times.

* * * * *